(12) United States Patent
Beermann et al.

(10) Patent No.: US 7,458,644 B2
(45) Date of Patent: Dec. 2, 2008

(54) VEHICLE SEAT, IN PARTICULAR A SPORTS SEAT

(75) Inventors: Frank Beermann, Kirchheim unter Teck (DE); Michael Ritzel, Kirchheim unter Teck (DE)

(73) Assignee: Recaro GmbH & Co. KG, Kirchheim unter Teck (DE)

( * ) Notice: Subject to any disclaimer, the term of this patent is extended or adjusted under 35 U.S.C. 154(b) by 0 days.

(21) Appl. No.: 11/998,294

(22) Filed: Nov. 28, 2007

(65) Prior Publication Data

US 2008/0088168 A1 Apr. 17, 2008

Related U.S. Application Data

(63) Continuation of application No. PCT/EP2006/005032, filed on May 26, 2006.

(30) Foreign Application Priority Data

Jun. 11, 2005 (DE) ............... 10 2005 027 074

(51) Int. Cl.
*B60R 22/00* (2006.01)
(52) U.S. Cl. ............... 297/483; 297/378.1; 297/484
(58) Field of Classification Search ............... 297/483, 297/484, 378.12, 378.13, 378.1
See application file for complete search history.

(56) References Cited

U.S. PATENT DOCUMENTS

| D280,472 S | 9/1985 | Seto |
| D283,469 S | 4/1986 | Zimmerman |
| D315,255 S | 3/1991 | Beermann |
| D317,534 S | 6/1991 | Hansel |
| D321,095 S | 10/1991 | Bockwoldt |
| D356,694 S | 3/1995 | Armbrecht |
| D391,410 S | 3/1998 | Tomforde et al. |
| D396,152 S | 7/1998 | Beermann et al. |
| D411,690 S | 6/1999 | Kneip et al. |
| 6,065,811 A * | 5/2000 | Weller ............ 297/483 |
| D504,579 S | 5/2005 | Beermann et al. |
| D509,077 S | 9/2005 | Beermann et al. |
| 7,273,232 B2 * | 9/2007 | Fontecchio et al. ......... 297/483 |

FOREIGN PATENT DOCUMENTS

| DE | 24 53 732 | 5/1976 |
| DE | 103 41 405 A1 | 4/2005 |
| JP | 1261466 | 1/2006 |
| JP | 1261468 | 1/2006 |
| JP | 1272713 | 6/2006 |
| WO | WO 2004/106106 A1 | 12/2004 |

OTHER PUBLICATIONS

U.S. Appl. No. 29/244,128, filed Dec. 6, 2005; In re: Michael Ritzel, entitled Vehicle Seat.
Notice of Allowability for a Design Patent Application for U.S. Appl. No. 29/244,128, filed Dec. 6, 2005; In re: Michael Ritzel, entitled Vehicle Seat.

* cited by examiner

*Primary Examiner*—Anthony D Barfield
(74) *Attorney, Agent, or Firm*—Womble Carlyle Sandridge & Rice, PLLC

(57) ABSTRACT

The invention relates to a vehicle seat (1), in particular a sports seat, with a seat cushion (3) and a backrest (5) which may be pivoted and locked relative to the seat cushion (3), comprising a handle (29) for unlocking the backrest (5) and at least one belt passage (11) for a seatbelt, wherein the handle (29) is integrated in the belt passage (11).

20 Claims, 1 Drawing Sheet

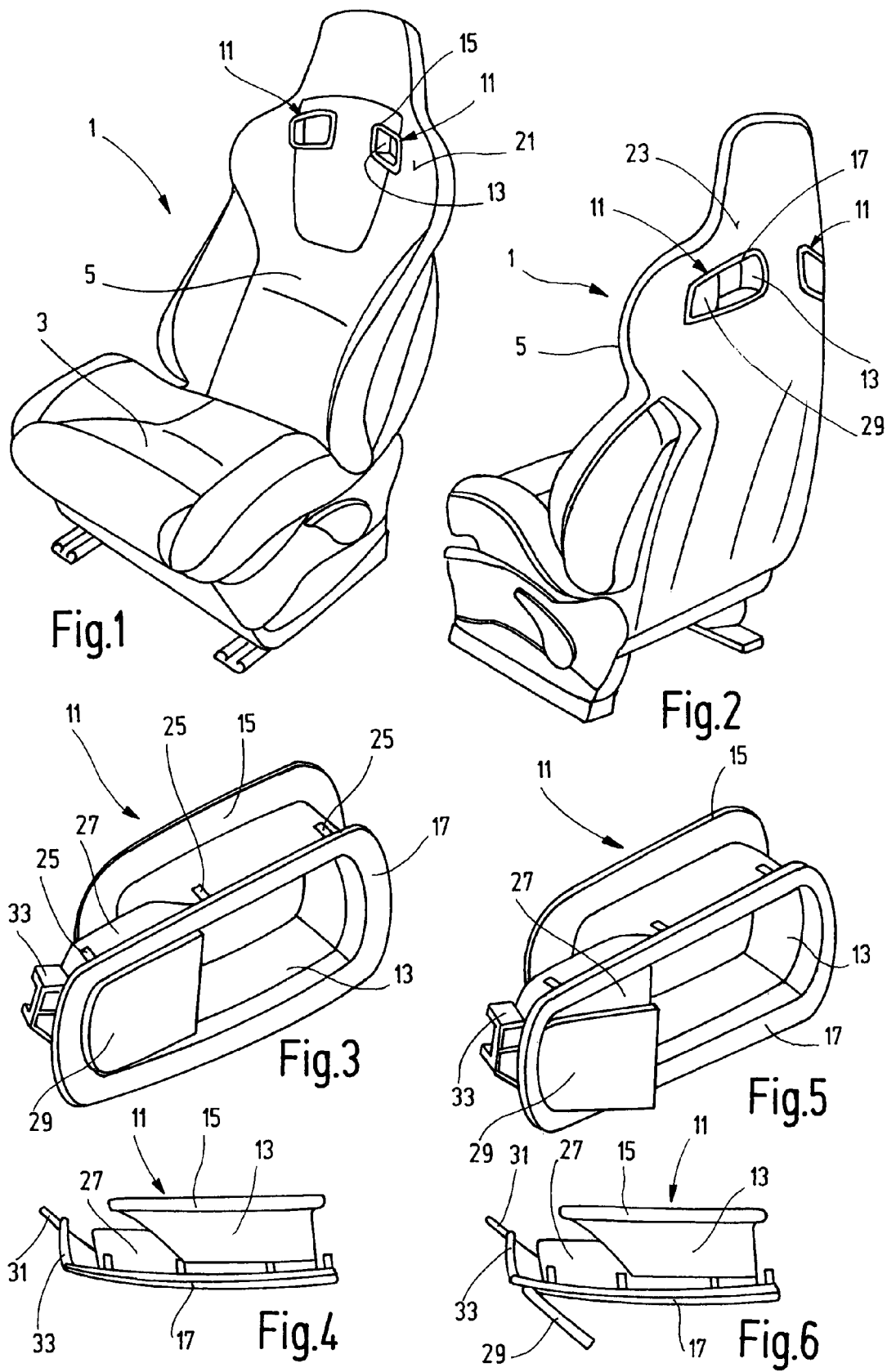

VEHICLE SEAT, IN PARTICULAR A SPORTS SEAT

CROSS-REFERENCE TO RELATED APPLICATION

The present application is a continuation of International Application PCT/EP2006/005032, which was filed May 26, 2006. The entire disclosure of International Application PCT/EP2006/005032, which was filed May 26, 2006, is incorporated herein by reference.

BACKGROUND OF THE INVENTION

The present invention relates to a vehicle seat, in particular a sports seat, having a seat part and a backrest that is pivotable and lockable relative to the seat part, with the backrest having a handle for unlocking the backrest and at least one belt passage for a safety belt.

In a known vehicle seat of the type described immediately above, which is designed as a sports seat for a two-door motor vehicle, two belt passages are provided for a four-point safety belt. In order to facilitate access to the second row of seats, the backrest can be freely pivoted. To allow the backrest to pivot free, it is unlocked by actuating the laterally arranged handle.

BRIEF SUMMARY OF SOME ASPECTS OF THE INVENTION

The present invention is based on the object of improving a vehicle seat of the type mentioned above. In accordance with an aspect of the present invention, a vehicle seat, in particular a sports seat, has a seat part and a backrest that is pivotable and lockable relative to the seat part, wherein the backrest is pivotable relative to the seat part in an unlocked state of the backrest, the backrest is restricted from pivoting relative to the seat part in a locked state of the backrest, the backrest includes at least one belt passage for a safety belt, and a handle for unlocking the backrest to thereby transition the backrest from the locked state to the unlocked state, wherein the handle is an integral part of the belt passage.

Because the handle is integrated into the belt passage, the number of individual parts of the vehicle seat is reduced and fewer openings are required in the covering or trim of the backrest. Both of these factors reduce the manufacturing and assembly costs, thus lowering the overall cost of the vehicle seat. In addition, the covering or trim is subjected to less wear and tear and the design of the covering or of the trim is less interrupted. When the unlocking process is triggered by the handle, the backrest can pivot freely, and where required an adjustment of the inclination of the backrest can also be made. It would also be conceivable to use the handle to trigger the pivoting of the entire vehicle seat into a position for entering the vehicle, or into a package position. The invention is particularly suitable for sports seats with four-point safety belts or seats with an integrated seat belt system.

For simple operation, the handle is preferably pivotably (or slidingly) mounted on the belt passage and can be actuated by pulling or pushing. When the backrest is in the locked state, the handle is preferably arranged in a recess and therefore out of the way. A bowden cable or similar device can preferably be attached to the handle, with the cable being attached to a bracket or similar device on the belt passage, and the handle unlocks the locking mechanism of the backrest by way of the bowden cable or similar device.

For the sake of a simple design that is easy to manufacture, the belt passage preferably has a tunnel providing a passageway between the front side and the rear side of the backrest, from which further components then project, in particular laterally, such as the handle recess or flanges. By way of the flanges, the edge of the covering or of the trim in the area of the belt passage can be concealed. With the exception of the handle, the belt passage is preferably of one-piece construction (and thus simple to manufacture), or it consists of a physical unit made up of parts fitted together, for example clipped together (and thus easy to assemble). The handle is preferably kept out of the way by having its outward-facing side lie flush with one of the two flanges during the locked state of the backrest. For easier accessibility using the tunnel, the handle is preferably pivotably mounted on the side of the handle recess facing away from the tunnel.

Other aspects and advantages of the present invention will become apparent from the following.

BRIEF DESCRIPTION OF THE DRAWINGS

In the following, the invention is described in greater detail with reference to an exemplary embodiment illustrated in the drawings.

FIG. 1 is a perspective front view of the exemplary embodiment.

FIG. 2 is a perspective rear view of the exemplary embodiment.

FIG. 3 is a perspective view of a belt passage in the locked state.

FIG. 4 is a top view of the belt passage in the locked state.

FIG. 5 is a perspective view of the belt passage in the unlocked state.

FIG. 6 is a top view of the belt passage in the unlocked state.

DETAILED DESCRIPTION OF EXEMPLARY EMBODIMENT

A vehicle seat 1, designed as a sports seat for a motor vehicle, has a seat part 3 and a backrest 5. The backrest 5 is mounted by way of fittings on the seat part 3 and can be pivoted freely relative to the seat part 3, i.e. the backrest 5 can be pivoted forwards in order to facilitate access to the next row of seats, and the backrest 5 can be locked in its substantially upright use position. In the upper part of the backrest 5, there are two belt passages 11, provided in two openings, for a four-point safety belt. Of the two belt passages 11, the belt passage 11 arranged closer to the vehicle doors (on the sillboard side) is described in the following.

The belt passage 11 consists of two parts that are clipped together during assembly to form a physical and functional unit on which the description of the belt passage 11 is based. In a modification of this design, these parts of the belt passage 11 can be formed together as one piece. The belt passage 11 has a tunnel 13 with a front flange 15 and a rear flange 17. The tunnel 13 is arranged in the backrest 5, and as a result the belt passage 11 creates a passageway between the rear side of the backrest 5 and the front side of the backrest 5. At the same time, the tunnel 13 conceals the inside of the backrest 5 in the area of the opening. The joint line between the two parts of the belt passage 11 runs, for example, transversely in relation to the tunnel 13.

The two flanges 15 and 17, which are provided at the ends of the tunnel 13, are integral parts of the tunnel 13 or may be connected as separate parts to the tunnel 13. The two flanges 15 and 17 project laterally from the tunnel 13 and are adapted to the surface contour of the backrest 5. The front flange 15 extends over the seat covering 21, and the rear flange 17 extends over the back shell of the backrest 5. Preferably, fastening features 25 are provided in the area between the rear flange 17 and the tunnel 13 in order to fasten the belt passage 11 to the back shell 23.

A handle recess 27 projects laterally from the tunnel 13. The approximately trapezoidal base part of the handle recess 27 is oriented parallel to the flange 17 and is offset in depth in relation to the flange 17. Three sides (e.g., walls) of the handle recess 27 extend rearwardly from the base of the recess to the rear flange 17. The fourth side of the handle recess 27 merges into the tunnel 13. A handle 29 is arranged within the handle recess 27 and is pivotably mounted on the side of the handle recess 27 facing away from the tunnel 13. The handle 29 is thus integrated into the belt passage 11, wherein the belt passage 11, with the exception of the handle 29, is formed in one piece, preferably made of injection-molded plastic.

On the side of the handle 29 facing towards the base of the handle recess 27, it is possible to attach the core of a bowden cable 31, which then passes through the base of the handle recess 27. The sheath of the bowden cable 31 is supported in a bracket 33 that in turn is formed on the handle recess 27, on the side facing away from the handle 29. The other end of the bowden cable 31 acts on the pivot-free devices of the fittings. Normally, i.e. in the locked state of the backrest 5 or its fittings, the handle 29—because of pretensioning in the bowden cable 31—is situated within the handle recess 27, so that its side facing outwards and away from the base of the recess is flush with the rear flange 17.

When the backrest 5 is to be pivoted free, i.e. when it must first be unlocked, the handle 29 is grasped and pivoted out of the handle recess 27, thereby pulling on the bowden cable 31 and unlocking the fittings, i.e. the backrest is unlocked. As the backrest 5 is pivoted forwards, the handle 29 can be released. The backrest 5 then remains unlocked. Once the backrest 5 is pivoted back into position again, the fittings lock once more and the handle 29—because of the aforementioned pretensioning in the bowden cable 31—is again pulled completely into the handle recess 27.

The second belt passage 11 on the (drive shaft) tunnel side of the vehicle is usually of conventional design, i.e. it does not have a handle recess 27 and a handle 29, but alternatively it could also be designed like the first belt passage 11 arranged closer to the vehicle doors (on the sill-board side).

It will be understood by those skilled in the art that while the present invention has been discussed above with reference to an exemplary embodiment, various additions, modifications and changes can be made thereto without departing from the spirit and scope of the invention as set forth in the following claims.

The invention claimed is:

1. A vehicle seat, comprising:
a seat part and a backrest that is pivotable and lockable relative to the seat part, wherein
the backrest is pivotable relative to the seat part in an unlocked state of the backrest;
the backrest is restricted from pivoting relative to the seat part in a locked state of the backrest;
the backrest includes
(a) at least one belt passage for a safety belt, and
(b) a handle for unlocking the backrest to thereby transition the backrest from the locked state to the unlocked state;
the handle is an integral part of the belt passage;
the belt passage comprises a tunnel;
the tunnel at least partially defines a passageway;
the passageway extends between opposite front and rear sides of the backrest;
the belt passage includes a handle recess;
the handle is arranged in the handle recess while the backrest is in the locked state; and
the handle recess projects laterally from the tunnel.

2. The vehicle seat according to claim 1, wherein the handle is pivotably mounted on the belt passage.

3. The vehicle seat according to claim 2, wherein:
the belt passage includes a bracket,
the vehicle seat further comprises a bowden cable that is attached to the handle, and
the bowden cable is supported on the bracket of the belt passage.

4. The vehicle seat according to claim 1, wherein:
the belt passage includes a bracket,
the vehicle seat further comprises a bowden cable that is attached to the handle, and
the bowden cable is supported on the bracket of the belt passage.

5. The vehicle seat according to claim 1, wherein the handle is pivotably mounted to the belt passage on a side of the handle recess that faces away from the tunnel.

6. The vehicle seat according to claim 5, wherein:
the belt passage includes flanges that are respectively positioned at opposite ends of the tunnel, and
the flanges project laterally from the tunnel.

7. The vehicle seat according to claim 1, wherein the handle is positioned and configured so that a majority of the handle protrudes rearwardly from a rear side of the backrest while the handle is actuated for unlocking the backrest.

8. The vehicle seat according to claim 1, wherein:
the belt passage includes flanges that are respectively positioned at opposite ends of the tunnel, and
the flanges project laterally from the tunnel.

9. The vehicle seat according to claim 8, wherein an outward-facing side of the handle is flush with one of the two flanges while the backrest is in the locked state.

10. The vehicle seat according to claim 9, wherein, except for the handle, the belt passage is formed in one piece.

11. The vehicle seat according to claim 9, wherein, except for the handle, the belt passage is formed as a physical unit made up of fitted-together parts.

12. A vehicle seat, comprising:
a seat part and a backrest that is pivotable and lockable relative to the seat part, wherein
the backrest is pivotable relative to the seat part in an unlocked state of the backrest;
the backrest is restricted from pivoting relative to the seat part in a locked state of the backrest;
the backrest includes
(a) at least one belt passage for a safety belt, and
(b) a handle for unlocking the backrest to thereby transition the backrest from the locked state to the unlocked state;
the handle is an integral part of the belt passage;
the belt passage comprises a tunnel;
the tunnel at least partially defines a passageway;
the passageway extends between opposite front and rear sides of the backrest;
the belt passage includes flanges that are respectively positioned at opposite ends of the tunnel; and
the flanges project laterally from the tunnel.

13. The vehicle seat according to claim 12, wherein the belt passage includes a handle recess, and the handle is arranged in the handle recess while the backrest is in the locked state.

14. The vehicle seat according to claim 13, wherein:
the belt passage includes a bracket, the vehicle seat further comprises a bowden cable that is attached to the handle, and
the bowden cable is supported on the bracket of the belt passage.

15. The vehicle seat according to claim 12, wherein an outward-facing side of the handle is flush with one of the two flanges while the backrest is in the locked state.

16. The vehicle seat according to claim 15, wherein, except for the handle, the belt passage is formed in one piece.

17. The vehicle seat according to claim 15, wherein, except for the handle, the belt passage is formed as a physical unit made up of fitted-together parts.

18. A vehicle seat, comprising:
a seat part and a backrest that is pivotable and lockable relative to the seat part, wherein
the backrest is pivotable relative to the seat part in an unlocked state of the backrest;
the backrest is restricted from pivoting relative to the seat part in a locked state of the backrest;
the backrest includes
 (a) at least one belt passage for a safety belt, and
 (b) a handle for unlocking the backrest to thereby transition the backrest from the locked state to the unlocked state;
the handle is an integral part of the belt passage; and
the handle is positioned and configured so that a majority of the handle protrudes rearwardly from a rear side of the backrest while the handle is actuated for unlocking the backrest.

19. The vehicle seat according to claim 18, wherein:
the belt passage comprises a tunnel,
the tunnel at least partially defines a passageway, and
the passageway extends between opposite front and rear sides of the backrest.

20. The vehicle seat according to claim 18, wherein the belt passage includes a handle recess, and the handle is arranged in the handle recess while the backrest is in the locked state.

* * * * *